US008160056B2

(12) United States Patent
Van der Merwe et al.

(10) Patent No.: US 8,160,056 B2
(45) Date of Patent: Apr. 17, 2012

(54) SYSTEMS, DEVICES, AND METHODS FOR NETWORK ROUTING

(75) Inventors: Jacobus E. Van der Merwe, New Providence, NJ (US); Samir Saad, Ocean, NJ (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 341 days.

(21) Appl. No.: 11/584,998

(22) Filed: Oct. 23, 2006

(65) Prior Publication Data

US 2008/0062891 A1 Mar. 13, 2008

Related U.S. Application Data

(60) Provisional application No. 60/843,231, filed on Sep. 8, 2006.

(51) Int. Cl.
*H04L 12/28* (2006.01)
(52) U.S. Cl. ............... 370/351; 370/401; 370/395.2; 709/239; 709/242
(58) Field of Classification Search ............ 370/351, 370/229, 254, 237, 401; 709/238, 239
See application file for complete search history.

(56) References Cited

U.S. PATENT DOCUMENTS

| | | | |
|---|---|---|---|
| 6,411,946 B1 | 6/2002 | Chaudhuri | |
| 6,760,775 B1 | 7/2004 | Anerousis | |
| 6,981,055 B1 * | 12/2005 | Ahuja et al. | 709/238 |
| 7,035,259 B2 | 4/2006 | Nomura | |
| 7,054,311 B2 | 5/2006 | Norman | |
| 7,120,118 B2 * | 10/2006 | Rajagopal et al. | 370/237 |
| 2002/0141378 A1 * | 10/2002 | Bays et al. | 370/351 |
| 2004/0034702 A1 * | 2/2004 | He | 709/224 |
| 2005/0180416 A1 * | 8/2005 | Jayawardena et al. | 370/389 |
| 2006/0029035 A1 * | 2/2006 | Chase et al. | 370/351 |
| 2006/0062142 A1 * | 3/2006 | Appanna et al. | 370/219 |
| 2006/0161673 A1 * | 7/2006 | Moon et al. | 709/230 |
| 2006/0256724 A1 * | 11/2006 | Martini et al. | 370/238 |
| 2007/0047464 A1 * | 3/2007 | Guingo et al. | 370/254 |
| 2008/0049751 A1 * | 2/2008 | Venkat et al. | 370/392 |
| 2009/0031040 A1 * | 1/2009 | Jayawardena et al. | 709/242 |
| 2009/0103536 A1 * | 4/2009 | Basso et al. | 370/392 |

FOREIGN PATENT DOCUMENTS

| | | |
|---|---|---|
| EP | 1737168 | 12/2002 |
| EP | 1580940 | 9/2005 |
| WO | WO/02/17110 | 2/2002 |

OTHER PUBLICATIONS

BGP <http://web.archive.org/web/20050409232109/http://www.estoile.com/links/bgp4.htm>.*
Agrawal, "RouterFarm: Towards a Dynamic, Manageable Network Edge", SIGCOMM'06, Sep. 11, 2006, 6 pages, ACM.

(Continued)

*Primary Examiner* — Dang Ton
*Assistant Examiner* — Mandish Randhawa
(74) *Attorney, Agent, or Firm* — Akerman Senterfitt; Michael K. Dixon; Roy Zachariah

(57) ABSTRACT

Certain exemplary embodiments comprise a method, which can comprise providing a preferred route for a predetermined block of traffic to a router. The predetermined block of traffic can be destined for a predetermined destination. The predetermined destination can be coupled to a network via a plurality of routers. The preferred route can be adapted to override an initial route.

18 Claims, 10 Drawing Sheets

OTHER PUBLICATIONS

Bonaventure, "The Case for More Versatile BGP Route Reflectors", Internet Engineering Task Force, Jul. 1, 2004, 15 pages, UCL.

Caesar, "BGP Routing Policies in ISP Networks", IEEE Network Magazine, Special Issue on Interdomain Routing, Nov. 1, 2005, 8 pages, IEEE.

Caesar, "Design and Implementation of a Routing Control Platform", 2nd Symposium on Networked Systems Design and Implementation, May 1, 2005, 14 pages, USENIX.

Duffield, "Predicting Resource Usage and Estimation Accuracy in an IP Flow Measurement Collection Infrastructure", IMC'03, Oct. 27, 2003, 13 pages, ACM.

Feamster, "The Case for Separating Routing from Routers", SIGCOMM'04 Workshops, Aug. 30, 2004, 8 pages, ACM.

Greenberg, "A Clean Slate 4D Approach to Network Control and Management", SIGCOMM Computer Communications Review, Oct. 1, 2005, 12 pages, ACM.

Mao, "Analyzing Large DDoS Attacks Using Multiple Data Sources", SIGCOMM'06 Workshops, Sep. 11, 2006, 8 pages, ACM.

Rexford, Jennifer, "Dynamics of Hot-Potato Routing in IP Networks", SIGMETRICS, Jun. 1, 2004, 30 pages, ACM.

Teixeira, "Tie Breaking: Tunable Interdomain Egress Selection", CoNEXT'05, Oct. 24, 2005, 14 pages, ACM.

* cited by examiner

6000 access-list 1 permit 10.1.1.1
access-list 2 permit 10.1.1.2
!
route-map outip-b permit 1
  match ip peeraddress 1
  set community 0:99
  on-match next
!
route-map outip-b permit 2
!
route-map inip-b permit 1
  match ip next-hop 2
  set local-preference 110
  on-match next
!
route-map inip-b permit 2
!

8000 route-map vpnin-a permit 1
 match ip next-hop PE4
 match extcommunity VPNA
 match ip address prefix-list DEFAULT
 set community GRP1_LP110 additive
 on-match next
!
route-map vpnin-a permit 1
 match ip next-hop PE4
 match extcommunity VPNA
 match ip address prefix-list DEFAULT
 set community GRP2_LP100 additive
 on-match next
!

Fig. 8

SYSTEMS, DEVICES, AND METHODS FOR NETWORK ROUTING

CROSS-REFERENCES TO RELATED APPLICATIONS

This application claims priority to, and incorporates by reference herein in its entirety, pending U.S. Provisional Patent Application Ser. No. 60/843,231, filed 8 Sep. 2006.

BRIEF DESCRIPTION OF THE DRAWINGS

A wide variety of potential practical and useful embodiments will be more readily understood through the following detailed description of certain exemplary embodiments, with reference to the accompanying exemplary drawings in which:

FIG. 8 is an exemplary block 8000 of pseudo code;

DETAILED DESCRIPTION

Figure 1:
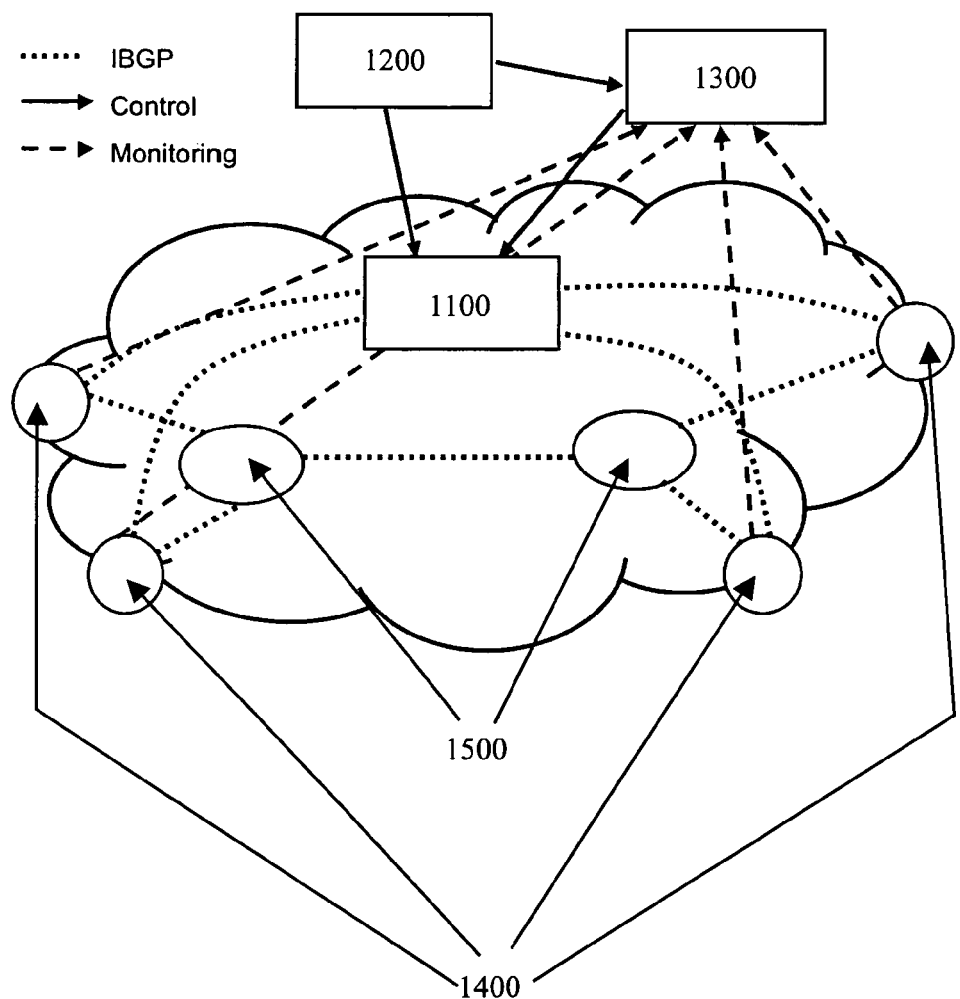
FIG. 1 is a block diagram of an exemplary embodiment of a system 1000.

Certain exemplary embodiments comprise a method, which can comprise providing a preferred route for a predetermined block of traffic to a router. The predetermined block of traffic can be destined for a predetermined destination. The predetermined destination can be coupled to a network via a plurality of routers. The preferred route can be adapted to override an initial route.

Increased use of demanding network applications, as well as the increase of unwanted network traffic in the form of distributed denial of service (DDoS) attacks, can result in pressures on service providers to meet the expectations of customers in terms of network availability and performance. Providers might be expected to deal with potential problems in near real-time fashion. Further, many demanding application, such as Voice over Internet Protocol (VoIP) communications and online gaming, can be sensitive to even small periods of disruption. Certain exemplary embodiments can provide dynamic connectivity management, which can be defined as an ability to dynamically manage how and where traffic flows across a network. Because dynamic connectivity management involves how traffic flows through a network, the Border Gateway Protocol (BGP) can be utilized for many management tasks. BGP can be a relatively complicated protocol, which can result in challenges in performing management tasks. In certain exemplary embodiments, a centralized Intelligent Route Service Control Point (IRSCP) can be adapted to allow route selection to be performed outside of network routers and/or allow route selection to be informed by external network intelligence.

Wanted and (unfortunately) unwanted uses of the Internet can result in pressure on providers to improve network management operations. Further, occurrences of DDoS attacks can impel more sophisticated and responsive network management practices from providers.

BGP can be used to satisfy a variety of business or traffic management objectives. Because BGP is involved with how traffic flows through the network, BGP can provide a means to facilitate relatively dynamic connectivity management. A BGP configuration can be complex and distributed over tens to thousands of routers depending on the size of an Internet Service Provider (ISP). A lack of direct control over the route selection process means that BGP might be challenging to utilize in realizing relatively common network management tasks. For example, using an Interior Gateway Protocol (IGP) path cost to break ties between a prefix that is reachable via multiple egress points might not take into account either provider concerns (traffic engineering) or customer concerns (load balancing across multiple interfaces).

Certain exemplary embodiments can comprise an Intelligent Route Service Control Point (IRSCP) as a platform for intelligent route control, which can be adapted to perform a number of connectivity management tasks. The IRSCP can be a logically centralized routing element, separate from routers, which can be utilized to control route selection in an Internet Protocol/Multiprotocol label switching (IP/MPLS) network. Certain exemplary embodiments can perform one or more of the following connectivity management tasks:

Selective blackholing of DDoS traffic: The IRSCP can be adapted to reduce negative impacts of DDoS by allowing selective blackholing to be performed by only dropping packets on routers where attack traffic has been detected.

Planned maintenance dryout: The IRSCP can be adapted to allow an operator to move traffic away from routers on which maintenance is to be performed, in a controlled manner, before such maintenance is performed, thus reducing the potential impact.

Virtual Private Network (VPN) gateway selection: The IRSCP can be adapted to allow MPLS VPN customers with multiple Internet gateways to explicitly select which VPN sites use each of the multiple gateways, rather than relying on default shortest path routing.

Network-aware load balancing: Depending on distribution of an offered (ingress) load, a coupling between IGP and BGP can cause loads on different egress points leading to the same destination to be unbalanced. The IRSCP can be adapted to inform route selection with external information to perform load balancing across multiple egress points leading to a given destination.

Using a protocol that operates at control time scales to perform connectivity management tasks can allow relatively fine grained, timely control of traffic flows. On the other hand, using a protocol that is inherently complex in itself to perform such tasks might cause complications. Certain exemplary embodiments can be adapted to automate details of protocol manipulation, allowing the operator to focus on functions to be performed, rather than how to accomplish the functions. Certain exemplary embodiments can provide a separation between policy and implementation. Certain exemplary embodiments can utilize external information to influence route selection. Certain exemplary embodiments can select routes based upon external information to realize common management tasks.

In certain exemplary embodiments, a planned maintenance dryout algorithm can function at the IP layer, and for multi-homed networks. A complimentary approach that functions across both IP and transport layers can provide near hitless planned maintenance to be performed for single-homed customers.

FIG. 1 is a block diagram of an exemplary embodiment of a system 1000, which presents a relatively high level view of an IRSCP 1100 in a network. System 1000 can comprise routers (R) 1400 and route-reflectors (RR) 1500, as well as IRSCP 1100 and associated functions. IRSCP 1100 can be a logically centralized network control element, i.e., it takes part in "control plane" functions but might not be in a data path. In particular, IRSCP 1100 can communicate with routers 1400 via Interior Border Gateway Protocol (iBGP): receiving routes from routers 1400, performing route selection on behalf of each router and communicating the selected routes back to the routers 1400. IRSCP 1100 can make use of an interior gateway protocol (IGP), like Open Shortest Path First (OSPF), to perform per-router route selection and to break ties as part of the normal BGP route selection process. In such a deployment scenario, where IRSCP 1100 is part of an internal BGP (iBGP) process, IRSCP 1100 might not control all route selection in system 1000. Specifically, routers 1400 might still make route selection decisions based on routes learned via Exterior Border Gateway Protocol (eBGP).

FIG. 1 shows two forms of input into IRSCP 1100. First is direct operator input 1200, which can be provided, for example, when a task like blackholing of DDoS traffic is performed. The second IRSCP input can be broadly termed "network intelligence" 1300 and indicates that IRSCP 1100 can allow external information to impact the routing process. For VPN gateway selection the externally provided information might simply be in the form of customer preference. Alternatively, for both VPN gateway selection and network aware load-balancing the external information can be based on actual network monitoring.

In certain exemplary embodiments, IRSCP 1100 can be responsible for route selection and distribution function in system 1000. IRSCP 1100 can be deployed in parallel with a regular route-reflector (RR) 1500 hierarchy. A parallel deployment strategy can result in certain limitations, e.g., IRSCP 1100 might not prevent routes from being distributed via route reflectors 1500, but can indicate the relative preference of routes distributed by IRSCP 1100.

Blackholing of DDoS traffic is a management task that can be performed by operators. An exemplary method can comprise a two step process. First a static route to a pre-defined "blackhole destination" can be configured on edge routers in system 1000. A static route can be set up such that traffic sent to a predetermined destination can be dropped at an edge router. The second step of the process can be invoked when a DDoS attack against a specific target prefix is detected in system 1000. A BGP speaking entity in system 1000 (i.e., a router and/or IRSCP 1100), can generate a more specific route (called the blackhole-route), for the target destination and sets the next-hop attribute of this blackhole-route to point to the previously configured blackhole destination. At this point, traffic destined to the blackhole destination might be dropped on entry to system 1000.

Since certain DDoS attacks target specific IP addresses, a blackhole route might only cover a corresponding/32 prefix and other traffic going to the less specific site-prefix might be allowed to pass through unhindered. While blackholing can mitigate the DDoS problem, the approach can have a drawback. Once invoked on a particular router, traffic towards the blackhole destination passing through that router might be dropped, thus potentially fulfilling an intent of an attacker because the destination might become unreachable. In certain exemplary embodiments, when a blackhole-route is injected into the network by a router that connects to a route-reflector hierarchy, the black-hole route can be distributed to certain edge routers, thus prohibiting certain communication to the target destination, while allowing other communications via other routers to take place.

In certain exemplary embodiments, IRSCP 1100 can be adapted to selectively send the blackhole-route to edge routers that carry DDoS traffic or carry a significant portion of DDoS traffic, which can be an advantage because DDoS attacks might not be widely distributed. In an exemplary case study, for certain DDoS attacks in an ISP network, over a four week period, only 0.1% of ingress interfaces contributed more than 90% of the DDoS traffic volume. This implies that significant mitigation might be realized by blackholing traffic on a small number of edge routers.

Figure 2:
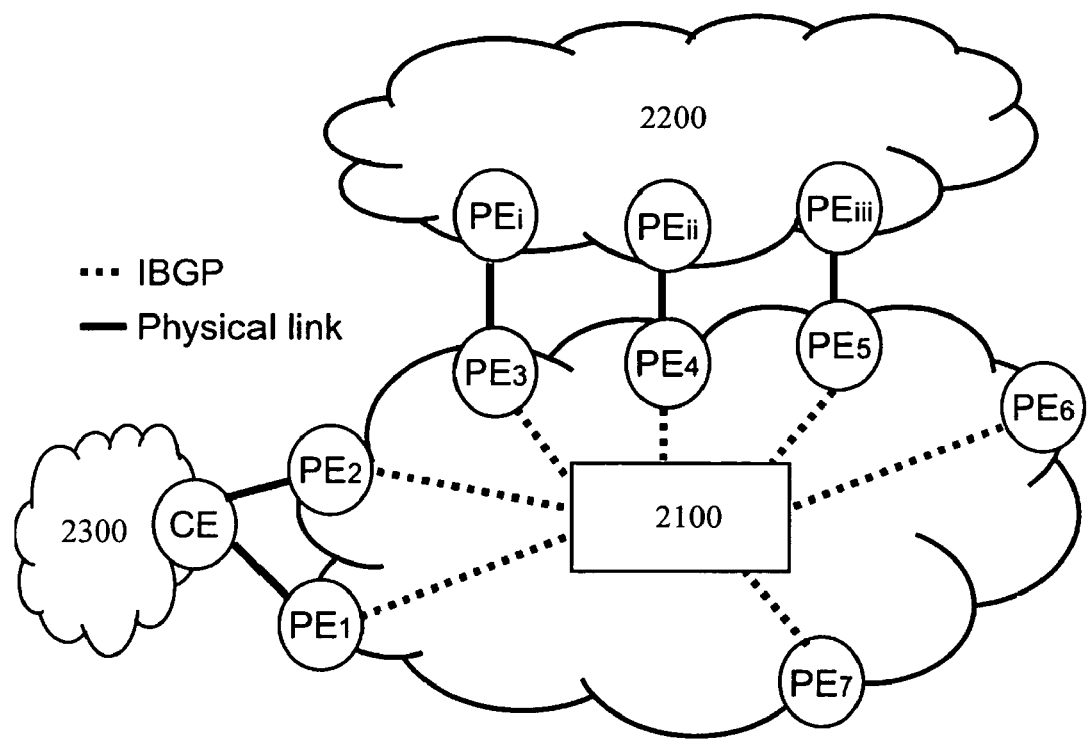
FIG. 2 is a block diagram of an exemplary embodiment of a system 2000.

FIG. 2 is a block diagram of an exemplary embodiment of a system 2000. ISPs can perform planned maintenance on routers to replace faulty hardware or install new router software. In instances where alternate paths are available to prefixes advertised by a router to be taken down (the dryout-router), an IRSCP 2100 can be adapted to reroute traffic around this router. System 2000 shows two instances where IRSCP 2100 can be utilized in this manner. In certain exemplary embodiments, customer-edge (CE) routers can be dual homed to two provider-edge (PE) routers, e.g., CE to $PE_1$ and $PE_2$ in system 2000. This arrangement can be for configured for customers and/or data center 2300. In certain exemplary embodiments, prefixes available in ISP network 2200 can be available via peering routers, $PE_3$, $PE_4$ and $PE_5$ of system 2000. In both exemplary embodiments, moving traffic away from the dryout-router can involve traffic in two directions namely traffic entering and leaving a network comprising IRSCP 2100.

For traffic leaving the ISP, dryout can involve identifying the alternate PE router(s) that are advertising the same prefixes as the dryout-PE and making routes from those PE routers more preferred. For example, if $PE_2$ is to be dried out, IRSCP 2100 can broadcast a signal to other PE routers in the network (i.e., $PE_3$ to $PE_7$) that a route via $PE_1$ is preferred to reach this network. IRSCP 2100 might do this by increasing a local preference attribute of routes received from $PE_1$ before distributing an advertised route to the other PE routers in system 2000. An exemplary IRSCP rule to realize this part of the dryout operation can be stated as therefore: for prefixes advertised by a dryout-router, if those prefixes are available from another router, make the prefixes available from the another router more preferred.

A similar method can be utilized in an exemplary embodiment where a peering PE router is dried out. In certain exemplary embodiments, however, more than one alternative path might be available as shown in the example in system 2000. In such embodiments, a dryout method might be improved by spreading a traffic load across all the alternate available paths. For example, if $PE_5$ is to be dried out, the operator might prefer to send some of the traffic via $PE_3$ and some via $PE_4$ to attempt to balance loads on alternative paths as a result of the shift in traffic. Splitting traffic between possible egress points can, in the first instance, be done by a proportional allocation of prefixes to the alternate egress points, but might make use of actual traffic loads to load balance the traffic. In certain exemplary embodiments, IRSCP 2100 can be adapted to split redirected traffic in a controlled and informed manner.

To move traffic coming into system 2000 around the dryout-router can influence routing decisions in neighboring networks and therefore cooperation from those networks can be desirable. In the data center scenario routing decisions can be made by pre-configuring a policy on the CE such that routes with a certain community value might be less preferred than routes without the community value. To initiate the dryout, IRSCP 2100 can add the special community value to all routes sent to the dryout-router, which in turn can send the routes on to the CE to trigger the change in preference. For example for system 2000, assuming that $PE_2$ is to be dried out, IRSCP 2100 can add the special community value to routes IRSCP 2100 receives from all other PEs before sending the routes to $PE_2$.

A similar approach can be utilized in the peering scenario, although using the BGP Message Entry Device (MED) attribute can be a simpler approach. Certain exemplary embodiments can comprise a peering arrangement where the peers agree to honor MED attributes. Using MED attributes, IRSCP 2100 can advertise selective routes with lower MED attributes to the PE routers where IRSCP 2100 provide instructions adapted to cause the traffic to be rerouted. In certain exemplary embodiments, IRSCP 2100 can advertise routes with higher MED values via the dryout PE, leaving it up to the peer network to decide how the traffic will be routed. In certain exemplary embodiments, a coarse grained approach might end up overloading peering links. In certain exemplary embodiments, IRSCP 2100 might modify MED attributes for iBGP routes. Such an iBGP speaking IRSCP 2100 might not fully dry out a peering router since some locally learned eBGP routes might not be affected. Certain exemplary embodiments can be adapted to provide routes of customers and data centers in system 2000.

Figure 3:
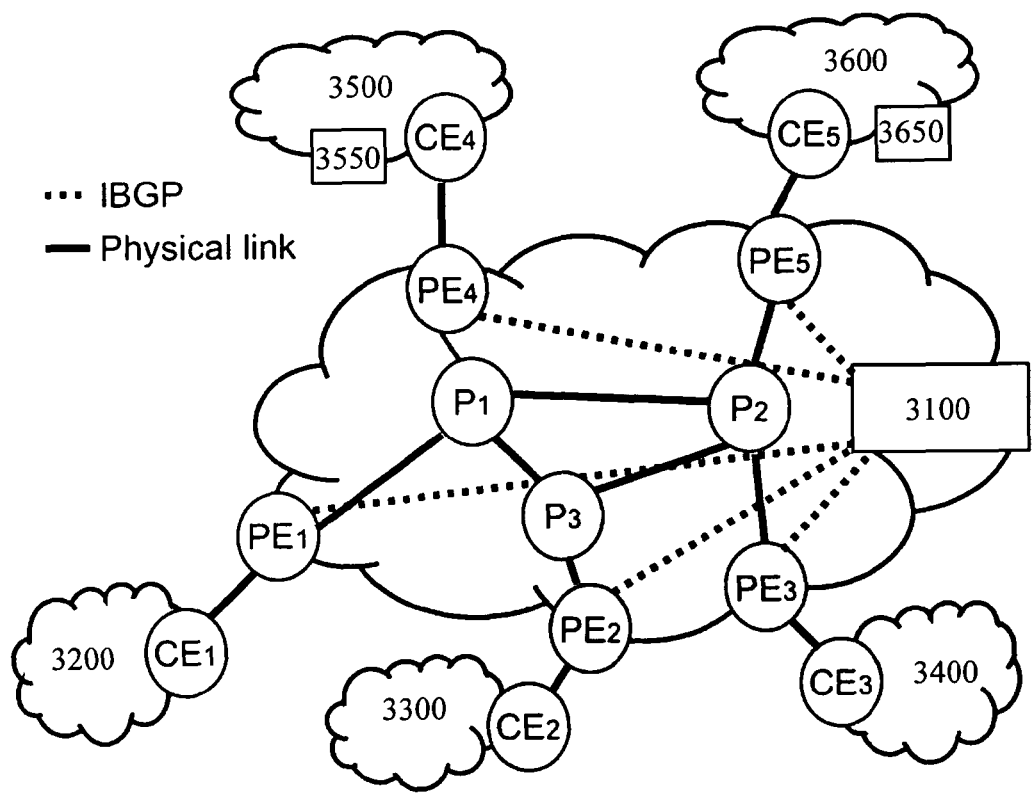
FIG. 3 is a block diagram of an exemplary embodiment of a system 3000.

FIG. 3 is a block diagram of an exemplary embodiment of a system 3000, which illustrates an exemplary MPLS VPN scenario. The example shows a single VPN consisting of five different sites (3200, 3300, 3400, 3500, and 3600). Connectivity between the sites is provided by the MPLS provider network. System 3000 provides an exemplary internal topology for the provider network.

In certain exemplary embodiments sites 3500 and 3600 can respectively comprise gateways 3550 and 3650 that collectively provide Internet connectivity for the VPN, and that the VPN customer might desire to load balance traffic across the two gateways. The provider network might not have knowledge of such customer goals and might route traffic across the backbone network according to default shortest path behavior. In an exemplary embodiment, wherein IGP link weights are equivalent, traffic in system 3000 from $CE_1/PE_1$ can exit the network at $PE_4/CE_4$ via $P_1$ and traffic from $CE_3/PE_3$ can exit at $PE_5/CE_5$ via $P_2$. For traffic from $CE_2/PE_2$ two equal cost paths might exist, namely via $P_3$ and $P_1$ to exit at $PE_4/CE_4$, or via $P_3$ and $P_2$ to exit at $PE_5/CE_5$. According to exemplary BGP tie-breaking rules (and assuming that the router-ID of $PE_4$ is smaller than that of $PE_5$), the path via $PE_4$ can be selected and the traffic can exit the network at $PE_4/CE_4$. In such an embodiment, traffic loading might be acceptable if the traffic from sites A and B roughly equal that from site C. If such is not the case, the Internet traffic might be unbalanced across the gateways.

Certain exemplary embodiments can be adapted to allow the customer to dictate the egress selection for traffic from different sites, thus allowing the default behavior to be overridden if desired. IRSCP 3100 can provide routing services to the customer by increasing the preference (e.g., by assigning a higher local preference value) of VPN routes received from $PE_5$ when the routes are sent to $PE_2$. Certain exemplary embodiments can be adapted to put controls associated with load balancing directly in the hands of customers through an appropriate interface, e.g., a Web portal, to IRSCP 3100.

Figure 4:
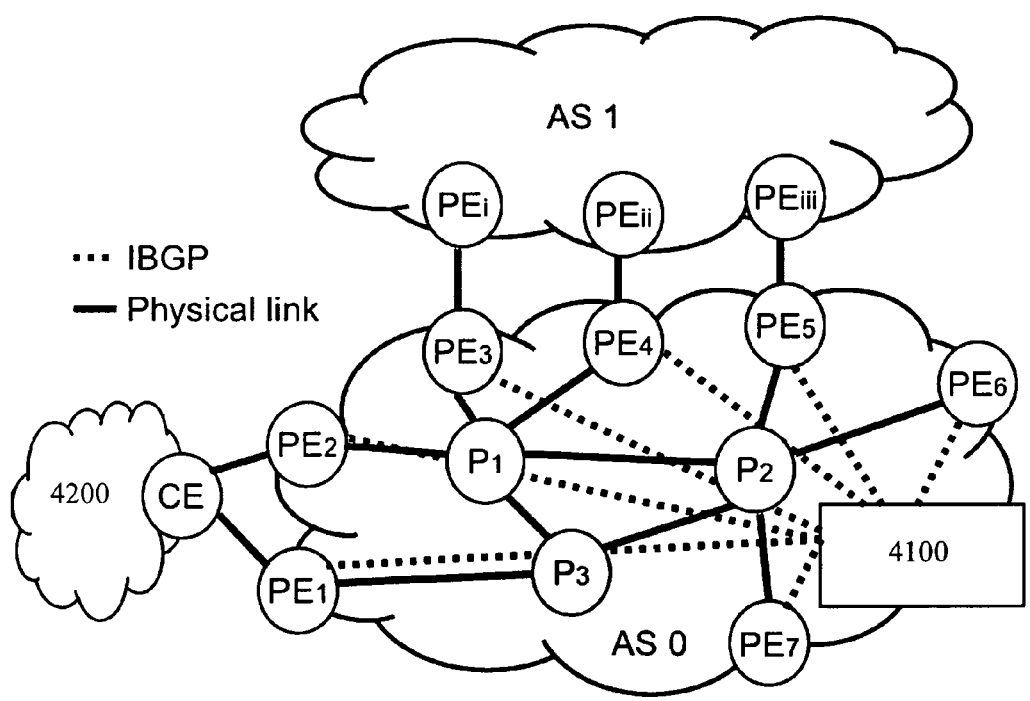
FIG. 4 is a block diagram of an exemplary embodiment of a system 4000.

FIG. 4 is a block diagram of an exemplary embodiment of a system 4000, which can be illustrative of a similar problem in the Internet environment. The potential problem stems from the coupling between BGP and IGP in the BGP decision process. For example, assume that a significant portion of the traffic destined to a data center 4200 (or customer network) is entering the IRSCP-enabled network from AS 1. Assuming that all IGP links weights are the same, both $PE_3$ and $PE_4$ might prefer to reach the data center using the routes advertised by $PE_2$. $PE_5$ might use the router-IDs of $PE_1$ and $PE_2$ to break the tie and might therefore also select to use the path through $PE_2$ (if the router ID of $PE_2$ is smaller than that of $PE_1$). In certain exemplary embodiments, absent intervention from IRSCP 4100, the link between $PE_2$ and CE might carry most of the traffic while the link between $PE_1$ and CE might be mostly idle.

Figure 5:
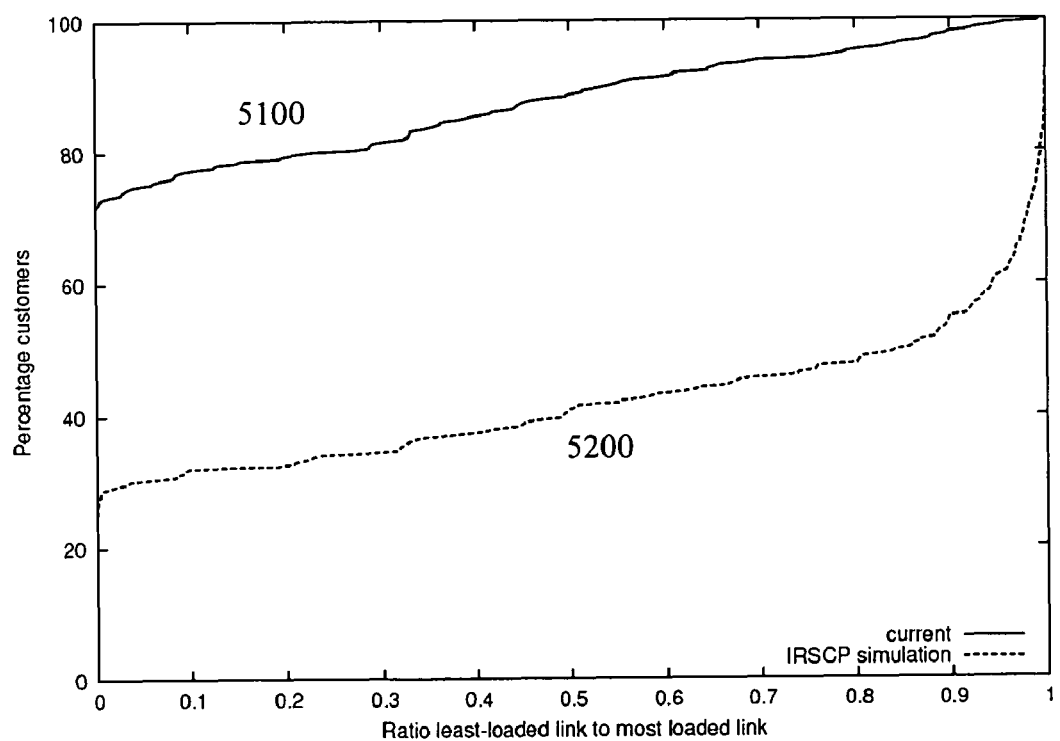
FIG. 5 is a graph 5000 of link load information for an exemplary network.

FIG. 5 is a graph 5000 of link load information for an exemplary network, which can comprise a graph a traffic ratio between a most loaded link and a least loaded link for each multi-homed customer in a large ISP on an exemplary day. The top curve 5100 ("current") presents the actual ratios observed on that day based on sampled Netflow records collected across the ISP network. For 71.8% of the customers, this ratio was zero, showing complete imbalance with the most loaded link carrying all the traffic and the least loaded link carrying no traffic at all.

IRSCP 4100 can be adapted to address this problem by basing the routing decision at the ingress routers on a historic offered load towards an exemplary multi-homed customer. For example, IRSCP 4100 can be adapted to monitor the traffic load at all ingress routers ($PE_3$ to $PE_7$), towards data center prefixes behind egress routers $PE_1$ and $PE_2$. This information can be obtained from, for example, Netflow data. Using load information, IRSCP 4100 can be adapted to redirect traffic by making the route from a selected egress router more preferred (increasing the local preference attribute), on a per-ingress router basis. In certain exemplary embodiments, IRSCP 4100 might direct traffic from both $PE_4$ and $PE_5$ to egress $PE_1$, thus overriding a default IGP based selection.

The bottom curve 5200 ("IRSCP simulation") in FIG. 5 illustrates simulation results of the same offered traffic load as before, but in this case showing the effect of IRSCP-based load balancing. Approximately 25% of the customers still have an unbalanced ratio of zero. The data for this graph was for a single day and approached load balancing at a granularity of an ingress router. In certain exemplary embodiments, traffic to a particular prefix might enter through a single ingress router, thus not offering the possibility to balance the load. Nonetheless, the improvement of curve 5200 compared to curve 5100 is evident from the graph, e.g., 50% of the customers in the study achieved a ratio of 0.87 or better.

In certain exemplary embodiments, IRSCP 411 can be adapted to improve load balancing on customer links.

TABLE I

| Function | Commands | Significant Parameters |
| --- | --- | --- |
| Selective Blackholing | addblackhole | routerlist |
| | delblackhole | prefix |
| Dryout | adddryout | dryout |
| | deldryout | backup |
| VPN Gateway Selection/ | addgroup | ingress |
| Load-balancing | delgroup | group |
| | | vpn |
| | addpolicy | egress |
| | delpolicy | pref |
| | | group |
| | | prefix |
| | | vpn |

An implementation used in an exemplary trial deployment made use of enhancements to the Quagga open source protocol suite (available from the Quagga Foundation, see the web site, quagga.net). Specifically, a modified version of Quagga's BGP implementation was utilized. A collection of Perl scripts were used to automate configuration details on an exemplary IRSCP and presented operators with a relatively high level functional control interface. Table 1 shows exemplary IRSCP primitives that were used and exemplary parameters for connectivity management functions. In certain exemplary embodiments, the interface provided an "add/del" type command to initiate and/or terminate selected connectivity management functions. Exemplary parameters for selective blackholing can comprise a prefix to be blackholed and a list of routers that should be blackholing traffic towards that prefix. The dryout function can obtain two router IP addresses as parameters, namely, an address of the dryout router and an address of a "backup" router via which traffic might be rerouted. For both the VPN gateway selection and the load-balancing functions certain exemplary embodiments can involve two primitives, which respectively request a specification of ingress or egress routers. An optional prefix parameter can be specified to make an executed function more specific.

Figure 6:
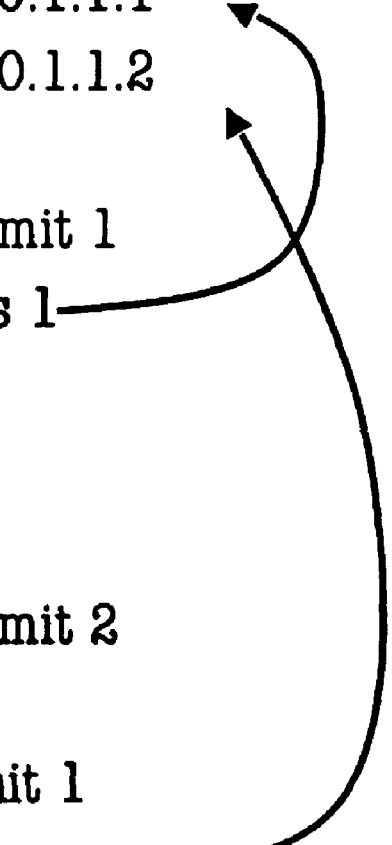
FIG. 6 is an exemplary block 6000 of pseudo code.

FIG. 6 is an exemplary block 6000 of pseudo code. When a command is invoked, a current IRSCP configuration can be read, parsed and/or interpreted to establish which parts of the configuration pertains to the current operation and to verify that everything is in place to support an operation. For example, determining that peering sessions are in place with the router(s) involved with the operation. The IRSCP configuration can be automatically updated to reflect changes related to the operation. For example, when an adddryout --dryout 10.1.1.1 --backup 10.1.1.2 primitive is invoked, in and out route-maps of the IRSCP can be automatically updated as shown in block 6000. The out route-map can set a community value when sending routes to the dryout router while the in route-map will attempt to cause routes from the backup router to be assigned a higher local preference attribute. Similarly, invoking a deldryout version of the command can remove one or more route-maps and access-list clauses.

As shown in Table 1, VPN gateway selection and/or load-balancing can be realized through two potential primitives. The first, add/delgroup, can associate a particular ingress router with a group of such routers that might all be receiving the same route. The second, add/delpolicy can specify a relative preference of a route received from a particular egress router and can state a relative preference to associate with that route when that route is passed to a previously defined group of routers.

For example, in system 3000 of FIG. 3, suppose that for the VPN shown, IRSCP 3100 can determine that $PE_1$ should have a higher preference for routes received from $PE_4$ than those received from $PE_5$, and for $PE_2$ to have the reverse preference. Because ISRCP 3100 has determined to treat $PE_1$ and $PE_2$ differently, a first step can be to associate them with different groups: addgroup --ingress PE1 -vpn VPNA --group 1 and addgroup --ingress PE2 --vpn VPNA --group 2.

Figure 7:
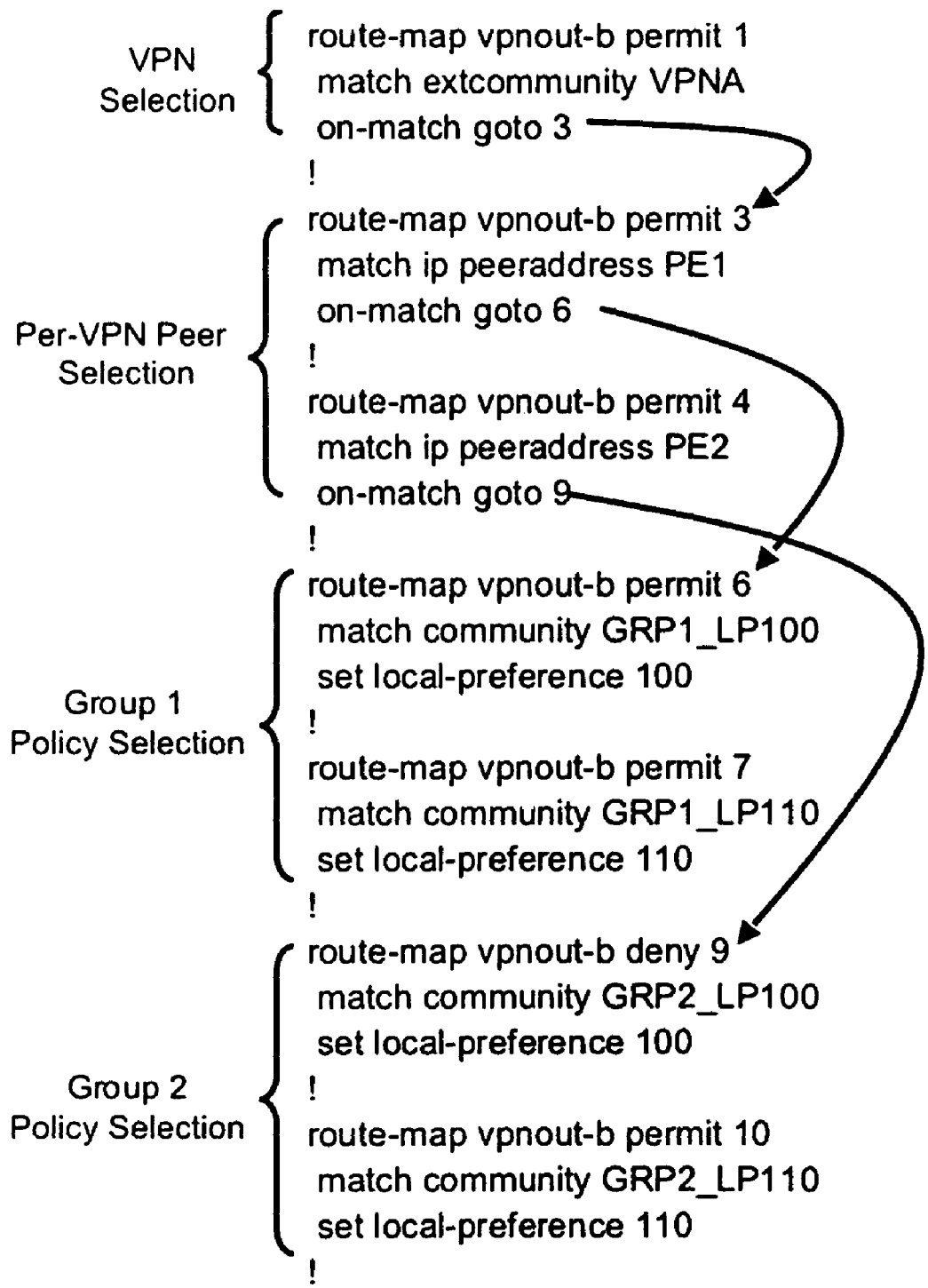
FIG. 7 is an exemplary block 7000 of pseudo code.

FIG. 7 is an exemplary block 7000 of pseudo code, which illustrates an exemplary IRSCP outgoing route-map that gets generated to as a result of running these commands. In this exemplary embodiment, there are three sections to this route-map. First, is the "VPN Selection" section, which match against routes that belong to the VPN in question (i.e., based on the route-target extended community values associated with the VPN). Routes that match this section might jump to the "Per-VPN Peer Selection" section. Each VPN, in which gateway selection is to be performed, can have its own VPN and Per-VPN Peer selection sections. A "peeraddress" match in the Per-VPN Peer section (i.e., the IRSCP is about to send a route to the matching peer), can cause a jump in the route-map to the appropriate "Group Policy Section" where the per-group policies are applied before routes are sent to the respective peers.

FIG. 8 is an exemplary block 8000 of pseudo code. Having dealt with the selective treatment of $PE_1$ and $PE_2$ in an exemplary embodiment, a next step can be to apply policies to routes received from $PE_4$ and $PE_5$. Block 8000 provides an example for routes received from $PE_4$. Commands addpolicy --egress PE4 --vpn VPNA --prefix DEFAULT --pref 110 --group 1, might result in the IRSCP in route-map shown in the top part of block 8000. In essence the three match statements might result in a condition that such a statement would be applied to routes from $PE_4$ that belong to the VPN in question and match the DEFAULT prefix list. A route that does match all these criteria on entry to the IRSCP, might have a special community value set that identifies it as requiring its local preference to be set to 110 when the route is sent to any PE in group 1 (GRP1_LP110). Referring back to block 7000, routes with an exemplary community value set can have a local preference set to 110. The bottom part of block 8000 shows the result of the command addpolicy --egress PE4 --vpn VPNA --prefix DEFAULT --pref 100 --group 2. Since the community values are set in an "additive" fashion, a route from $PE_4$ that matches all the criteria can be "tagged" twice on entry to the IRSCP so that the correct part of the out route-map can be triggered to realize an objective.

In certain exemplary embodiments, the IRSCP can be adapted to dynamically control the BGP protocol to realize connectivity management functions. Certain exemplary embodiments can be adapted to allow external information to inform route selection, whether that be by making use of network load conditions or by providing customers direct control about how their traffic is routed through the network.

The routers in a single Autonomous System (AS) can exchange routes to external destinations using a protocol called internal BGP (iBGP). Small networks can be configured as a "full mesh" iBGP topology, with an iBGP session between each pair of routers. However, a full-mesh configuration does not necessarily scale because each router typically must: (i) have an iBGP session with every other router, (ii) send BGP update messages to every other router, (iii) store a local copy of the advertisements sent by each neighbor for each destination prefix, and (iv) have a new iBGP session configured whenever a new router is added to the network. Although having a faster processor and more memory on every router would support larger full-mesh configurations, the installed base of routers tends to lag behind the technology curve, and upgrading routers can be costly. In addition, BGP-speaking routers might not always degrade gracefully when resource limitations are reached; for example, routers can crash and/or experience routing instability under such conditions.

To avoid the scaling problems of a full mesh, certain exemplary embodiments can configure iBGP as a hierarchy of route reflectors. A route reflector can select a single BGP route for each destination prefix and/or advertise the route to its clients. Adding a new router to the system often simply requires configuring iBGP sessions to the router's route reflector(s). Using route reflectors can reduce the memory and/or connection overhead on the routers. A route reflector does not necessarily select the same BGP route that its clients would have chosen in a full-mesh configuration. Unfortunately, the routers along a path through the AS can be assigned different BGP routes from different route reflectors.

The IRSCP can receive IGP topology information from the IGP Viewer and BGP can route from the BGP Engine, compute the routes for a group of routers, and/or return the resulting route assignments to the routers using the BGP Engine.

Networks can be used to communicate information between end systems such as users, servers, and the like. Information can be transmitted in the form of IP (Internet Protocol) packets of digital data. Each IP packet can comprise a header with the source IP address and port number, the destination IP address and port number, and other fields. The network can be adapted to deliver the IP packets to their respective destinations. To perform this task, networks can comprise routers for routing and transmitting the data packets.

A router can be connected to another router via a transmission link. The transmission link can connect a port on the first router to a port on the second router. All of the pairs of routers might not be connected and, conversely, there can be multiple links between any two given routers. A link weight can be assigned to each link automatically and/or by an administrator of the network. Each router in the network can run one or more routing protocols such as the Open Shortest Path First (OSPF) protocol or the Multiprotocol Label Switching (MPLS) protocol, or some other suitable routing protocol or combination of routing protocols. Different routing protocols can be used in different portions of the network, and any one segment can run more than one protocol.

In the MPLS protocol, each IP packet can be encapsulated in a new header or label and/or can be provided with an MPLS label ID. A sequence of label assignments, one label for each link in the path, can be used to establish an end-to-end MPLS path between routers in the network for each destination IP address. As in the case of IP networks, the path can correspond to an aggregated set of destination IP addresses, indicated by an IP address and prefix or IP address and mask. When a packet is switched from an incoming port to an outgoing port inside an MPLS network, the incoming label can be removed and/or the packet encapsulated in a new (outgoing) label.

Detailed network traffic measurement in general can be both important and expensive. Measurements in VPNs (virtual private networks) in particular can be expensive since typically expensive measurement equipment can be manually and physically deployed within a particular VPN. The equipment can be deployed and can be utilize and/or be communicatively coupled to active probing devices such as ping probes, application transaction simulators, and/or passive devices such as traffic sniffers that can measure performance and/or security properties. The cost of deploying these devices can be even further compounded by the fact that in many cases the measurements only need to be performed for and/or during short periods of time, such as when a performance and/or security problem has been noticed by a user.

The Border Gateway Protocol (BGP) is an inter-domain routing protocol that Autonomous Systems (ASes) typically use to exchange information about how to reach destination address blocks (or prefixes).

BGP can be considered to be a path vector protocol. A router can send an advertisement of a new route for a destination prefix or a withdrawal when the route is no longer available. Each BGP advertisement can include the list of ASes along the path, along with other attributes such as the next-hop IP address. Before accepting an advertisement, the receiving router can check for the presence of its own AS number in the AS path to discard paths with loops. By representing the path at the AS level, BGP can hide the details of the topology and routing inside each network.

To minimize the number of routes in the routing table, BGP can aggregate ranges of routes into one or more larger CIDR blocks. For instance, consider customer sites X and Y connecting to provider ISP A. If ISP A owns the address block 24.1.0.0/16, it can assign prefixes 24.1.1.0/24 and 24.1.2.0/24 to X and Y respectively, and still represent their addresses in the single aggregated address block 24.1.0.0/16. However, site prefixes might not be aggregated this way. For example, large enterprise networks often multi-home to different providers in order to increase the availability of network connectivity. In this case, the enterprise's address block typically will not be aggregated into the other providers' address blocks, and so the enterprise's address block typically will be advertised individually across the network.

BGP can be considered to be a policy-oriented protocol. Rather than selecting the route with the shortest AS path, routers can apply complex policies to influence the selection of the best route for each prefix and to decide whether to propagate this route to neighbors. ISPs, often acting on behalf of their customers, can try various things to manipulate how traffic flows to them. Certain exemplary embodiments can utilize AS prepending, where an ISP repeats its own AS number in the route advertisements sent to its neighbors, in the hope that paths going through itself will be less preferred due to the increase in path length. ISPs can also provide more complex AS prepending for their customer networks. This can allow the customers to spread the traffic over multiple links. However, it can be very hard to predict the effect of AS prepending on remote networks. One way to achieve finer grained control over incoming traffic, then, can be to selectively advertise even smaller prefixes along different links. For example, customer Y might desire to have traffic designated to 24.1.2.0/25 to be carried by ISP A and rest traffic toward it to be carried by ISP B. To achieve this, Customer Y breaks its address space 24.1.2.0/24 into two /25 sub-nets and advertise 24.1.1.0/25 to ISP A and 24.1.2.128/25 to ISP B. The traffic destined to 24.1.2.0/25 can be carried by ISP A and rest traffic towards Y can be carried by ISP B.

So for instance, when the packet arrives at router R2 (perhaps through a default route, or through a virtual prefix route, described later), the forwarding entry (Prefix=24.1.1.0/24, TE=4.1.1.1) might indicate that the packet should be tunneled to 4.1.1.1. The packet transmitted by R2, then, will have an outer header addressed to 4.1.1.1 (with a source address of 2.1.1.1), and the original header as the inner header. Also shown is the forwarding table entry at R2 needed to natively forward the tunneled packet towards 4.1.1.1. This is shown as a /32 to emphasize that the tunnel endpoint is a single address. In practice this may be aggregated into a larger prefix (in fact may have to be, if BGP policy isn't changed to allow a /32).

After leaving R2, the tunneled packet eventually reaches R3. Whether or not R3 has a forwarding table entry for 24.1.1.0/24 at this point is irrelevant (though R3 may indeed not have such an entry). The packet is still being tunneled, and R3 uses its forwarding table entry for 4.1.1.1 to forward the packet towards R4. Since router R4 is the destination of the outer header, R4 de-tunnels the packet when it receives it. Router R4, and all subsequent routers, can be adapted to forward the packet until it reaches the destination host. Note that the tunneled portion can be between R2 and R4.

Once an IRSCP determines a preferred route, the route can be distributed to devices via an infrastructure of distribution agents. Most routers might not need to know about a majority of route changes, so even if routers all could participate in a flooding algorithm, such an algorithm might be inefficient.

Certain exemplary embodiments can configure agents into a sparse overlay and use a link-state style flooding algorithm to distribute routes. An overlay topology can be designed and/or implemented. In certain exemplary embodiments, link-state flooding algorithms might be used to detect a most recent update, periodic updates to insure convergence, and so on).

In terms of speed of convergence, a flood can be faster than BGP because BGP routers might delay forwarding of an eBGP advertisement for upwards of 30 seconds after the advertisement is received. This is because an update can take multiple paths through the network, and so a router can expect to receive multiple advertisements triggered by the same event. If a router immediately forwards advertisements, then later advertisements received by different path may result in a different route selection, and therefore additional advertisements. In addition, the distance in hops that a BGP advertisement has to take to work its way through the Internet is larger than a corresponding flood. The flooding overlay can easily be engineered to have a diameter of only a few hops (logN, where N is the number of participating agents). BGP updates, on the other hand, may ultimately travel 20 or 30 hops across the router topology.

BGP routers can be adapted to perform path selection computations before they can pass on an update. With flooding, any necessary computations can be done after the flood. Therefore, flooding can take place essentially as fast as agents can forward the mappings. The distribution infrastructure scales not by the number of agents, but by the number of routings. This is because each agent only needs to be aware of its neighbor agents, not all agents.

If the growth in routings exceeds the capacity of the distribution infrastructure, then the distribution infrastructure may be partitioned by address space. In other words, disjoint groups of distribution agents each participate in the distribution of mappings with a given range of prefixes. While it would make sense to partition these ranges identically to virtual prefixes, it is not strictly necessary to do so. In certain exemplary embodiments ingress agents can feed mappings into multiple such partitions, because ingress agents can receive prefixes from customers. This ability to divide-and-conquer the distribution problem can be adapted to allow a scaling of a distribution architecture.

Certain exemplary embodiments might not use flooding to distribute routings. Pub/sub or gossip architectures may also work.

Figure 9:
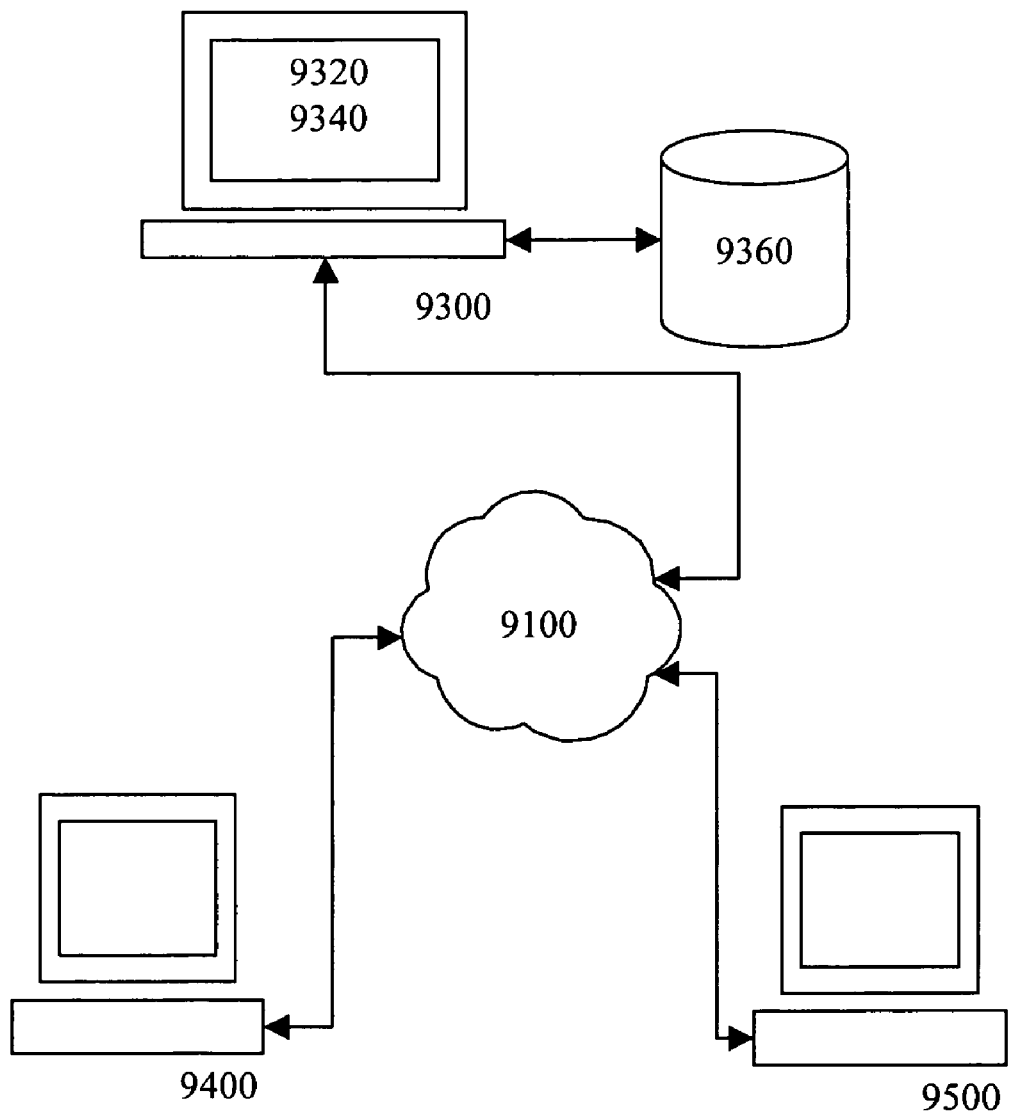
FIG. 9 is a block diagram of an exemplary embodiment of a system 9000.

FIG. 9 is a side view of an exemplary embodiment of a system 9000, which can comprise a network 9100. Network 9100 can be a mesh network and/or backbone network, which can comprise a plurality of routers and/or routing devices (not illustrated). A first information device 9400 can be communicatively coupled to a second information device 9500 via network 9100. Potential routes within network 9100 to communicatively couple information device 9400 and information device 9500 can be monitored and/or controlled via an IRSCP 9300. IRSCP 9300 can comprise and/or be communicatively coupled to a memory device 9360, which can be adapted to store topology information and/or routing information related to network 9100. IRSCP 9300 can comprise a user interface 9320 and/or a user program 9340. User program 9340 can be adapted to monitor network link loads within network 9100 and/or recommend route changes based upon network link loads. User program 9340 can be adapted to cause a rendering of information related to routes and/or link loads of network 9100 via user interface 9320.

Figure 10:
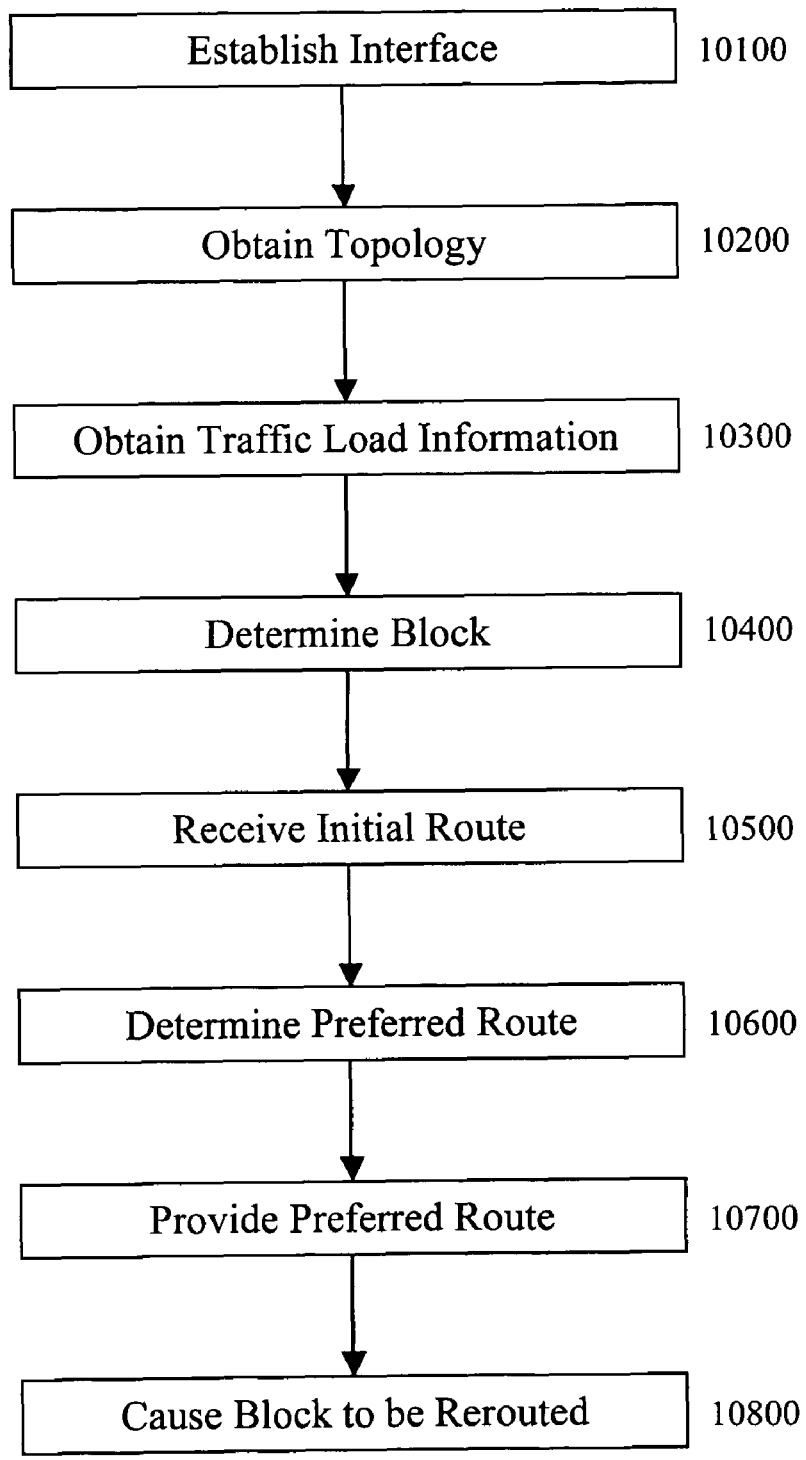
FIG. 10 is a flowchart of an exemplary embodiment of a method 10000.

FIG. 10 is a flowchart of an exemplary embodiment of a method 10000. At activity 10100, an interface can be established between an Intelligent Route Service Control Point (IRSCP) and a plurality of routing devices of a network. In certain exemplary embodiments, an interface can be established between the IRSCP and each of a sub-plurality of egress routers. In certain exemplary embodiments, the network can be a backbone network. In certain exemplary embodiments, the IRSCP might not be a routing device.

At activity 10200, a topology of the network can be obtained. For example, a plurality of Interior Gateway Protocol link weights can be obtained. In certain exemplary embodiments, addresses and/or identities of each of the plurality of routers can be obtained. The IRSCP can be adapted to maintain a table and/or map of the topology of the plurality of routers and/or links associated therewith.

At activity 10300, traffic load information can be obtained. In certain exemplary embodiments, the traffic load information can be Netflow information obtained from one or more of the plurality of routers comprised by the network. In certain exemplary embodiments, the monitored traffic load information can be obtained from all ingress routers of the network.

At activity 10400, a block of traffic, to be considered for rerouting within the network, can be identified, determined, and/or predetermined. The predetermined block of traffic can be identified and/or determined based upon a request of a predetermined multi-homed customer associated with a predetermined destination. In certain exemplary embodiments, the predetermined block of traffic can be destined for the multi-homed customer. In certain exemplary embodiments, the predetermined block of traffic can be identified and/or determined based on a Classless InterDomain Routing (CIDR) block. The block of traffic can be destined for the predetermined destination. The predetermined destination can be coupled to the network via a sub-plurality of egress routers of the plurality of routing devices.

At activity 10500, an initial route of the block of traffic can be obtained and/or received. The initial route might have been determined based upon Interior Gateway Protocol topology information and/or link weights associated with the network topology. The initial route can comprise a first egress router of the sub-plurality of egress routers, the second egress router distinct from the first egress router. In certain exemplary embodiments, the IRSCP can request information regarding the initial route. For example, the IRSCP can request information from one or more of the plurality of routers comprised by the network and/or a routing device associated with the predetermined destination.

At activity 10600, a preferred route can be determined for the block of traffic. The preferred route can be determined by and/or via the IRSCP. The preferred route can be determined based upon monitored traffic load information obtained from one or more ingress routers comprised by the network. The preferred route can be determined based upon the Interior Gateway Protocol topology information. In certain exemplary embodiments, the preferred route can be determined without intervention by a device comprised by the predetermined destination or an operator thereof. The preferred route can comprise a second egress router of the sub-plurality of egress routers. In certain exemplary embodiments, the first egress router can be distinct from the second egress router.

At activity 10700, the preferred route can be provided to one or more of the plurality of routers comprised by the network. The IRSCP can be adapted to transmit a signal that is adapted to cause the preferred route to override the initial route. Certain exemplary embodiments can be adapted to dynamically advertise the preferred route to at least one of the sub-plurality of egress routers. In certain exemplary embodiments, the IRSCP can be adapted to manipulate a distribution of routes in the network. For example, the IRSCP might restrict distribution of the preferred route to a predetermined sub-set of the plurality of routers. In certain exemplary embodiments, the IRSCP can be adapted to flood the sub-plurality of egress routers with the preferred route.

At activity 10800, the predetermined block can be rerouted via the preferred route. The IRSCP can be adapted to cause the predetermined route to be rerouted via the preferred route by providing and/or advertising the preferred route to one or more of the sub-plurality of egress routers and/or the plurality of routers comprised by the network.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

activity—an action, act, deed, function, step, and/or process and/or a portion thereof.

adapted to—suitable, fit, and/or capable of performing a specified function.

advertise—to send a message containing a BGP and/or iBGP announcement.

all—every member and/or component of a set and/or entity.

and/or—either in conjunction with or in alternative to.

apparatus—an appliance or device for a particular purpose.

associate—to relate, bring together in a relationship, map, combine, join, and/or connect.

at least—not less than.

automatically—acting and/or operating in a manner essentially independent of external human influence and/or control. For example, an automatic light switch can turn on upon "seeing" a person in its view, without the person manually operating the light switch.

backbone network—a "transit" network, often made up of long-distance telephone trunk lines and/or other wired and/or wireless links such as microwave and satellite links, adapted for transmitting large amounts of data simultaneously between host computer systems connected to the Internet. Normal communicated data typically neither originates nor terminates in a backbone network.

based upon—determined in consideration of and/or derived from.

between—in a separating interval and/or intermediate to.

block—an identified group of packets sharing one or more common destination address characteristics.

can—is capable of, in at least some embodiments.

cause—to bring about, provoke, precipitate, produce, elicit, be the reason for, result in, and/or effect.

Classless Inter-Domain Routing (CIDR)—a scheme and/or protocol that: allocates blocks of Internet addresses in a manner that allows summarization into a smaller number of routing table entries (as specified in RFC 1519); allows the assignment of Class C IP addresses in multiple contiguous blocks; and/or builds on the concept of supernetting, with more than one block of network addresses being linked together logically into a supernet.

comprised by—included by.

comprising—including but not limited to, what follows.

configure—to design, arrange, set up, shape, and/or make suitable and/or fit for a specific purpose.

convert—to transform, adapt, and/or change, such as from a first form to a second form.

couple—to join, connect, and/or link two things together.

create—to make, form, produce, generate, bring into being, and/or cause to exist.

customer—a potential and/or actual purchaser of goods and/or services.

data—information represented in a form suitable for processing by an information device.

data structure—an organization of a collection of data that allows the data to be manipulated effectively and/or a logical relationship among data elements that is designed to support specific data manipulation functions. A data structure can comprise meta data to describe the properties of the data structure. Examples of data structures can include: array, dictionary, graph, hash, heap, linked list, matrix, object, queue, ring, stack, tree, and/or vector.

define—to establish the meaning, relationship, outline, form, and/or structure of; and/or to precisely and/or distinctly describe and/or specify.

destined—directed to a place, address, and/or entity.

determine—to obtain, calculate, decide, deduce, establish, and/or ascertain.

device—a machine, manufacture, and/or collection thereof.

distinct—discrete and/or readily distinguishable from all others.

distribution—the process of supplying something to one or more users.

dynamically—in an interactive manner wherein a current state is dependent on a past and/or future input and/or output.

each—every one of a group considered individually.

egress—(n) a place, port, and/or device associated with exiting; (v) to exit.

estimate—to calculate and/or determine approximately and/or tentatively.

for—with a purpose of.

from—used to indicate a source.

further—in addition.

generate—to create, produce, render, give rise to, and/or bring into existence.

haptic—both the human sense of kinesthetic movement and the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

information—facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information.

information device—any device on which resides a finite state machine capable of implementing at least a portion of a method, structure, and/or graphical user interface described herein. An information device can comprise well-known communicatively coupled components, such as one or more network interfaces, one or more processors, one or more memories containing instructions, one or more input/output (I/O) devices, and/or one or more user interfaces (e.g., coupled to an I/O device) via which information can be rendered to implement one or more functions described herein. For example, an information device can be any general purpose and/or special purpose computer, such as a personal computer, video game system (e.g., PlayStation, Nintendo Gameboy, X-Box, etc.), workstation, server, minicomputer, mainframe, supercomputer, computer terminal, laptop, wearable computer, and/or Personal Digital Assistant (PDA), iPod, mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, a digital signal processor, an ASIC or other integrated circuit, a hardware electronic logic circuit such as a discrete element circuit, and/or a programmable logic device such as a PLD, PLA, FPGA, or PAL, or the like, etc.

ingress—(n) a place, port, and/or device associated with entering; (v) to enter.

initial—at a beginning.

initialize—to prepare something for use and/or some future event.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

Intelligent Route Service Control Point (IRSCP)—a device adapted to provide a preferred route for a predetermined block of traffic to a router.

interface—(n) a boundary across which two independent systems meet and act on and/or communicate with each other. (v) to connect with and/or interact with by means of an interface.

Interior Gateway Protocol (IGP)—a protocol used to exchange routing information between collaborating routing entities in the Internet. Examples include RIP and OSPF.

intervention—an interference intended to modify a process.

link—a physical and/or logical communication channel between a pair of switching and/or routing devices; and/or an activateable connection to another web page, location in a web page, file, and/or other Internet resource.

load—an intensity of traffic flow.

machine instructions—directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine-readable medium—a physical structure from which a machine, such as an information device, computer, microprocessor, and/or controller, etc., can obtain and/or store data, information, and/or instructions. Examples include memories, punch cards, and/or optically-readable forms, etc.

manipulate—to adjust and/or change.

may—is allowed and/or permitted to, in at least some embodiments.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

monitor—to observe.

more—greater.

multi-homed—addressable via a plurality of distinct addresses and/or multiple IP addresses addressable as a single IP address, URL, and/or domain.

Netflow—a software feature and/or protocol adapted to collect IP traffic information.

network—a communicatively coupled plurality of nodes, communication devices, and/or information devices. Via a network, such devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, multi-domain, and/or multi-zone sub-network and/or protocol, one or more Internet service providers, and/or one or more information devices, such as a switch, router, and/or gateway not directly connected to a local area network, etc., and/or any equivalents thereof.

network interface—any physical and/or logical device, system, and/or process capable of coupling an information device to a network. Exemplary network interfaces comprise a telephone, cellular phone, cellular modem, telephone data modem, fax modem, wireless transceiver, Ethernet card, cable modem, digital subscriber line interface, bridge, hub, router, or other similar device, software to manage such a device, and/or software to provide a function of such a device.

not—a negation of something.

obtain—to receive, get, take possession of, procure, acquire, calculate, determine, and/or compute.

operator—an entity able to control a machine.

override—to replace one or more previously assigned parameters or values.

packet—a generic term for a bundle of data organized in a specific way for transmission, such as within and/or across a network, such as a digital packet-switching network, and comprising the data to be transmitted and certain control information, such as a destination address.

plurality—the state of being plural and/or more than one.

predetermined—established in advance.

preferred—improved as compared to an alternative.

probability—a quantitative representation of a likelihood of an occurrence.

processor—a hardware, firmware, and/or software machine and/or virtual machine comprising a set of machine-readable instructions adaptable to perform a specific task. A processor can utilize mechanical, pneumatic, hydraulic, electrical, magnetic, optical, informational, chemical, and/or biological principles, mechanisms, signals, and/or inputs to perform the task(s). In certain embodiments, a processor can act upon information by manipulating, analyzing, modifying, and/or converting it, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

project—to calculate, estimate, and/or predict.

provide—to furnish, supply, give, convey, send, and/or make available.

receive—to gather, take, acquire, obtain, accept, get, and/or have bestowed upon.

recommend—to suggest, praise, commend, and/or endorse.

regarding—pertaining to.

render—to display, annunciate, speak, print, and/or otherwise make perceptible to a human, for example as data, commands, text, graphics, audio, video, animation, and/or hyperlinks, etc., such as via any visual, audio, and/or haptic means, such as via a display, monitor, printer, electric paper, ocular implant, cochlear implant, speaker, etc.

repeatedly—again and again; repetitively.

request—(v.) to express a need and/or desire for; to inquire and/or ask for. (n.) that which communicates an expression of desire and/or that which is asked for.

route—a path along which information, such as packets, can be sent.

router—a device adapted to direct traffic and/or determine the next network point to which a data packet should be forwarded enroute toward its destination. The router is connected to at least two networks and determines which way to send each data packet based on its current understanding of the state of the networks it is connected to. Routers create or maintain a table of the available routes and use this information to determine the best route for a given data packet. Examples include a router, route-reflector, route server, server-based router, router-switch, sets of routers, and/or intra-networking devices, etc. A typical router operates at least at the bottom 3 layers (Physical, Link, and Network layers) of the OSI model.

said—when used in a system or device claim, an article indicating a subsequent claim term that has been previously introduced.

select—to make and/or indicate a choice and/or selection from among alternatives.

set—a related plurality of predetermined elements; and/or one or more distinct items and/or entities having a specific common property or properties.

signal—information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

store—to place, hold, retain, enter, and/or copy into and/or onto a machine-readable medium.

substantially—to a considerable, large, and/or great, but not necessarily whole and/or entire, extent and/or degree.

system—a collection of mechanisms, devices, data, and/or instructions, the collection designed to perform one or more specific functions.

thereof—of that.

topology information—information regarding the physical and/or logical configuration of a communication network.

traffic—a flow of bits, packets, datagrams, calls, and/or messages.

transmit—to provide, furnish, supply, send as a signal, and/or to convey (e.g., force, energy, and/or information) from one place and/or thing to another.

user interface—a device and/or software program for rendering information to a user and/or requesting information from the user. A user interface can include at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

utilize—to use and/or put into service.

via—by way of and/or utilizing.

weight—a value indicative of a cost of a certain resource.

wherein—in regard to which; and; and/or in addition to.

without—not accompanied by.

Note

Still other practical and useful embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, performed by multiple entities, and/or performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

Any information in any material (e.g., a U.S. patent, U.S. patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, the descriptions and drawings are to be regarded as illustrative in nature, and not as restrictive.

What is claimed is:

1. A method of providing a preferred route to a router for a predetermined block of traffic, the method comprising:

providing the preferred route to the router for the predetermined block of traffic that is destined for a predetermined destination coupled to a backbone network via a plurality of egress routers, wherein the preferred route comprises an intelligent route service control point in the backbone network;

determining the preferred route based on monitored traffic load information obtained from at least one ingress router of the backbone network and without intervention by a device of the predetermined destination and an operator of the backbone network;

overriding an initial route determined based upon interior gateway protocol information with the preferred route, wherein the preferred route includes a first egress router of the plurality of egress routers, wherein the initial route comprises a second egress router of the plurality of egress routers, wherein the second egress router is distinct from the first egress router, wherein the preferred route includes a special community value indicating that the preferred route with the special community value is less preferred than a different route without the special community value such that the second egress router is avoided as the predetermined block of traffic reaches the predetermined destination;

restricting distribution of the preferred route to a predetermined subset of egress routers of the plurality of egress routers;

flooding the subset of the egress routers with the preferred route; and providing a web-based interface to enable a customer intended to receive the predetermined block of traffic to select which egress routers of the plurality of egress routers are utilized in the preferred route, wherein the web-based interface enables the customer to load balance traffic, and wherein the web-based interface enables the customer to override the preferred route and the initial route.

2. The method of claim 1, further comprising:
overriding the initial route.

3. The method of claim 1, further comprising:
determining the initial route.

4. The method of claim 1, further comprising:
requesting information regarding the initial route.

5. The method of claim 1, further comprising:
determining the preferred route.

6. The method of claim 1, further comprising:
obtaining the monitored traffic load information.

7. The method of claim 1, further comprising:
obtaining a plurality of interior gateway protocol link weights, the initial route determined based upon the plurality of interior gateway protocol link weights.

8. The method of claim 1, further comprising:
dynamically advertising the preferred route to at least one of the plurality of egress routers.

9. The method of claim 1, further comprising:
manipulating a distribution of routes in the backbone network.

10. The method of claim 1, further comprising:
creating an interface between the intelligent route service control point and each of the plurality of egress routers.

11. The method of claim 1, further comprising:
obtaining interior gateway protocol topology information, the preferred route determined utilizing the interior gateway protocol topology information.

12. The method of claim 1, further comprising:
determining the predetermined block of traffic.

13. The method of claim 1, further comprising:
determining the predetermined block of traffic based upon a request of a predetermined multi-homed customer.

14. The method of claim 1, wherein the predetermined block of traffic is determined based on a classless interdomain routing block.

15. The method of claim 1, wherein the predetermined block of traffic is destined for a multi-homed customer.

16. The method of claim 1, wherein the monitored traffic load information is obtained via Netflow.

17. The method of claim 1, wherein the monitored traffic load information is obtained from all ingress routers of the backbone network.

18. A non-transitory machine-readable medium comprising machine implementable instructions for activities comprising:

providing a preferred route to a router for a predetermined block of traffic that is destined for a predetermined destination coupled to a backbone network via a plurality of egress routers, wherein the preferred route comprises an intelligent route service control point in the backbone network;

determining the preferred route based on monitored traffic load information obtained from at least one ingress router of the backbone network and without intervention by a device of the predetermined destination and an operator of the backbone network;

overriding an initial route determined based upon interior gateway protocol information with the preferred route, wherein the preferred route includes a first egress router of the plurality of egress routers, wherein the initial route comprises a second egress router of the plurality of egress routers, wherein the second egress router is distinct from the first egress router, wherein the preferred route includes a special community value indicating that the preferred route with the special community value is less preferred than a different route without the special community value such that the second egress router is avoided as the predetermined block of traffic reaches the predetermined destination;

restricting distribution of the preferred route to a predetermined subset of egress routers of the plurality of egress routers;

flooding the subset of the egress routers with the preferred route; and providing a web-based interface to enable a customer intended to receive the predetermined block of traffic to select which egress routers of the plurality of egress routers are utilized in the preferred route, wherein the web-based interface enables the customer to load balance traffic, and wherein the web-based interface enables the customer to override the preferred route and the initial route.

* * * * *